(12) United States Patent
Shastri et al.

(10) Patent No.: US 11,171,835 B2
(45) Date of Patent: Nov. 9, 2021

(54) AUTOMATED GENERATION OF AN INFORMATION TECHNOLOGY ASSET ONTOLOGY

(71) Applicant: EMC IP Holding Company LLC, Hopkinton, MA (US)

(72) Inventors: Ravi R. Shastri, Bangalore (IN); Mainak Chowdhury, Kolkata (IN)

(73) Assignee: EMC IP Holding Company LLC, Hopkinton, MA (US)

(*) Notice: Subject to any disclaimer, the term of this patent is extended or adjusted under 35 U.S.C. 154(b) by 219 days.

(21) Appl. No.: 16/690,572

(22) Filed: Nov. 21, 2019

(65) Prior Publication Data
US 2021/0157671 A1    May 27, 2021

(51) Int. Cl.
| | |
|---|---|
| H04L 12/24 | (2006.01) |
| G06F 11/07 | (2006.01) |
| G06F 11/32 | (2006.01) |
| G06F 11/30 | (2006.01) |
| H04L 29/08 | (2006.01) |
| H04L 12/751 | (2013.01) |
| H04L 29/14 | (2006.01) |

(52) U.S. Cl.
CPC .......... *H04L 41/12* (2013.01); *G06F 11/0772* (2013.01); *G06F 11/0793* (2013.01); *G06F 11/301* (2013.01); *G06F 11/3006* (2013.01); *G06F 11/324* (2013.01); *H04L 29/14* (2013.01); *H04L 41/06* (2013.01); *H04L 41/22* (2013.01); *H04L 45/02* (2013.01); *H04L 67/36* (2013.01)

(58) Field of Classification Search
CPC ......... H04L 41/12; H04L 29/14; H04L 41/06; H04L 41/22; H04L 45/02; H04L 67/36; G06F 11/0772; G06F 11/0793; G06F 11/3006; G06F 11/301; H06F 11/324
See application file for complete search history.

(56) References Cited

U.S. PATENT DOCUMENTS

| | | | |
|---|---|---|---|
| 9,043,658 B1 * | 5/2015 | Marr | G06F 11/2273 |
| | | | 714/47.2 |
| 9,954,883 B2 * | 4/2018 | Ahuja | G06F 21/577 |
| 2003/0220860 A1 | 11/2003 | Heytens et al. | |

(Continued)

*Primary Examiner* — Duc C Ho
(74) *Attorney, Agent, or Firm* — Ryan, Mason & Lewis, LLP (57) ABSTRACT

A method includes obtaining information regarding a plurality of information technology assets in use across an enterprise system, identifying dependencies between the information technology assets in use across the enterprise system, and generating an information technology asset ontology comprising a knowledge graph with nodes representing the information technology assets and edges between the nodes representing dependencies between the information technology assets. The method also includes monitoring the information technology assets of the enterprise system to detect one or more events and, responsive to detecting a given one of the one or more events, utilizing the information technology asset ontology to identify one or more of the information technology assets of the enterprise system affected by the given event. The method further comprises applying one or more remedial measures to at least a given one of the identified information technology assets of the enterprise system affected by the given event.

20 Claims, 8 Drawing Sheets (56) References Cited

U.S. PATENT DOCUMENTS

| | | | |
|---|---|---|---|
| 2007/0067847 A1* | 3/2007 | Wiemer | H04L 63/1433 726/25 |
| 2008/0133259 A1 | 6/2008 | O'Connor et al. | |
| 2008/0172630 A1 | 7/2008 | Dang et al. | |
| 2010/0293163 A1 | 11/2010 | McLachlan et al. | |
| 2011/0238658 A1 | 9/2011 | Schimmelpfeng | |
| 2012/0030262 A1 | 2/2012 | Barrenechea | |
| 2017/0237778 A1* | 8/2017 | DiGiambattista | H04L 63/1441 726/1 |
| 2017/0289187 A1* | 10/2017 | Noel | G06F 16/28 |
| 2017/0346839 A1* | 11/2017 | Peppe | H04L 63/1433 |
| 2019/0306173 A1* | 10/2019 | Reddy | H04L 63/126 |
| 2020/0177619 A1* | 6/2020 | Hadar | H04L 63/20 |
| 2020/0351294 A1* | 11/2020 | Davis | H04L 63/20 |

\* cited by examiner

AUTOMATED GENERATION OF AN INFORMATION TECHNOLOGY ASSET ONTOLOGY

FIELD

The field relates generally to information processing, and more particularly to techniques for managing information technology assets.

BACKGROUND

An information technology (IT) infrastructure may utilize various different types of IT assets, such as different types of software across different servers or other computers of an enterprise network or system. In some cases, particular types of IT assets can expose the operator of the IT infrastructure to various risks and security threats. It is therefore important to have knowledge of the various types of IT assets in use across an IT infrastructure. Significant manual effort, however, is required to generate and manage a portfolio of IT assets that are in use across an IT infrastructure.

SUMMARY

Illustrative embodiments of the present disclosure provide techniques for managing information technology assets utilizing automated ontologies.

In one embodiment, a method comprises obtaining information regarding a plurality of information technology assets in use across an enterprise system, identifying dependencies between the plurality of information technology assets in use across the enterprise system, and generating an information technology asset ontology comprising a knowledge graph with nodes representing the plurality of information technology assets and edges between the nodes representing dependencies between the plurality of information technology assets. The method also comprises monitoring the plurality of information technology assets of the enterprise system to detect one or more events and, responsive to detecting a given one of the one or more events, utilizing the information technology asset ontology to identify one or more of the plurality of information technology assets of the enterprise system affected by the given event. The method further comprises applying one or more remedial measures to at least a given one of the identified information technology assets of the enterprise system affected by the given event. The method is performed by at least one processing device comprising a processor coupled to a memory.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
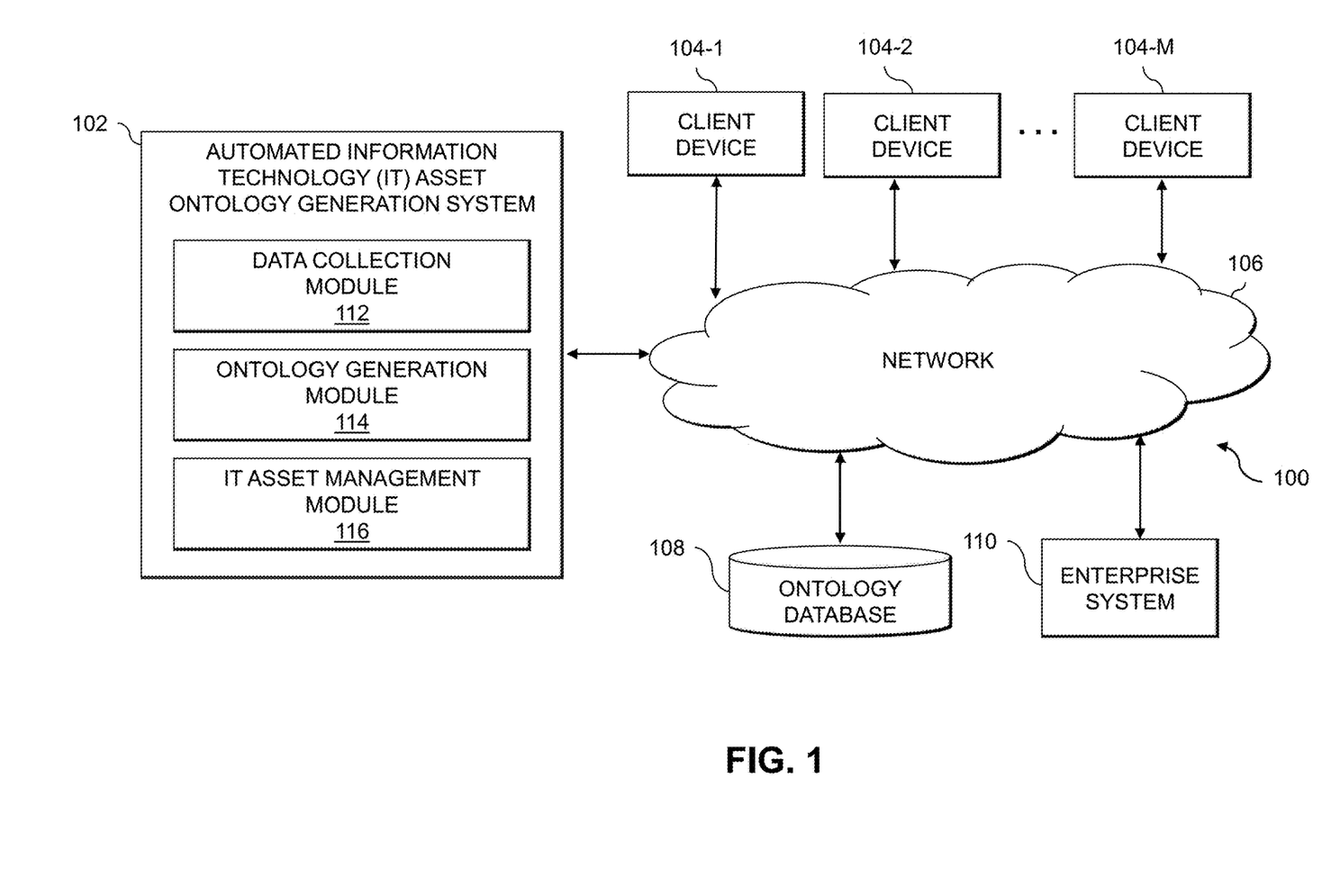
FIG. 1 is a block diagram of an information processing system for managing information technology assets utilizing automated ontologies in an illustrative embodiment.

FIG. 1 shows an information processing system 100 configured in accordance with an illustrative embodiment. The information processing system 100 is assumed to be built on at least one processing platform and provides functionality for managing information technology (IT) assets of an enterprise system 110 utilizing an IT asset ontology. Advantageously, an automated IT asset ontology generation system 102 is provided, which is configured to automate the generation of the IT asset ontology and to make the IT asset ontology available to end-users (e.g., via a query interface, via one or more visualizations, etc.) to detect events and otherwise generate insights for managing the IT assets of the enterprise system 110.

The information processing system 100 includes the automated IT asset ontology generation system 102, which is coupled via a network 106 to the enterprise system 110. The enterprise system 110 is assumed to be accessed, over network 106, by client devices 104-1, 104-2, . . . 104-M (collectively, client devices 104). The system 100 also includes an ontology database 108 coupled to the network 106, which may store various information related to an IT asset ontology that is automatically generated for IT assets of the enterprise system 110 as described herein. The IT assets may include, by way of example, software that runs on physical and virtual computing resources of the enterprise system 110. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc. The IT assets may also or alternatively include the physical and virtual computing resources themselves, users or operators of the physical and virtual computing resources, etc.

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise. At least portions of the system 100 may thus be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The ontology database 108 may be any type of database configured to store an IT asset ontology or information related to or used in generation of an IT asset ontology generated for IT assets of the enterprise system 110. Such information may include, by way of example, a product taxonomy of IT products, a list of IT assets in use by the enterprise system 110, mappings of IT assets in use to IT products in the product taxonomy, metadata or other tag information for IT assets, logs and other information collected from various tools that monitor the assets of the enterprise system 110 (e.g., for generating dependency graphs for IT assets), etc.

The ontology database 108 in some embodiments is implemented using one or more storage systems or devices associated with the microservices design recommendation tool 102. In some embodiments, one or more of the storage systems utilized to implement the microservices database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the automated IT asset ontology generation system 102, as well as to support communication between the automated IT asset ontology generation system 102 and other related systems and devices not explicitly shown.

In some embodiments, the client devices 104 may implement host agents that are configured for communication with the automated IT asset ontology generation system 102. The host agents implemented by the client devices 104 may be configured to receive alerts and notifications generated by the automated IT asset ontology generation system 102, which are provided over network 106 to the client devices 104 (which may be operated or utilized by a system administrator, IT manager or other authorized personnel). Such host agents may be implemented via the client devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 106 with the automated IT asset ontology generation system 102. For example, a given host agent may comprise a mobile telephone equipped with a mobile application configured to receive alerts from the automated IT asset ontology generation system 102 and to provide an interface for the host agent to select particular remediation measures for responding to the alert or notification. The alert or notification, for example, may be generated on detecting an event associated with one or more IT assets of the enterprise system 110. The remediation measures may include various actions for responding to the detected event. When the detected event comprises a security threat, the remediation measures may include, but are not limited to, blocking access by one or more of the client devices 104 to IT assets of the enterprise system 110, requiring user input or authentication by the client devices 104 to obtain information from or otherwise utilize one or more IT assets of the enterprise system 110, triggering further review of the enterprise system 110 or IT assets thereof, etc. Remediation measures for responding to a detected security event may also include applying security hardening procedures to IT assets of the enterprise system 110, establishing new or modified monitoring of IT assets of the enterprise system 110, changing or adjusting the configuration of IT assets of the enterprise system 110, etc.

Detected events, however, are not limited solely to detecting security threats and the remediation measures are not limited to actions taken to respond to security threats. For example, a detected event may be associated with licensing for IT assets (e.g., determining that a license is needed, that licenses are expiring, etc.), where the remediation measures may include obtaining or renewing licenses. A given detected event may also be related to identifying a new dependency between IT assets, which may cause remediation measures such as updating access to or ownership of the IT assets, ensuring compatibility between the IT assets, etc. Various other examples are possible.

It should be noted that a "host agent" as this term is generally used herein may comprise an automated entity, such as a software entity running on a processing device. Accordingly, a host agent need not be a human entity.

Although shown as separate from the client devices 104 and the enterprise system 110 in the FIG. 1 embodiment, it should be appreciated that the automated IT asset ontology generation system 102 may be implemented at least in part within one or more of the client devices 104 or at least in part within the enterprise system 110, or combinations thereof, in some embodiments.

The automated IT asset ontology generation system 102 in the FIG. 1 embodiment is assumed to be implemented using at least one processing device. Each such processing device generally comprises at least one processor and an associated memory, and implements one or more functional modules for controlling certain features of the microservices design recommendation tool 110. In the FIG. 1 embodiment, the automated IT asset ontology generation system 102 implements data collection module 112, an ontology generation module 114 and an IT asset management module 116.

The data collection module 112 is configured to obtain information regarding a plurality of IT assets in use across the enterprise system 110. The enterprise system 110, for example, may include various physical and virtual computing resources, and the IT assets may comprise software (e.g., operating systems (OSes), applications, services, etc.) running on the physical and virtual computing resources. The IT assets may also include coding languages, coding frameworks, software libraries, software components, etc., that are utilized by the software running on the physical and virtual computing resources.

The ontology generation module 114 is configured to identify dependencies between the plurality of IT assets in use across the enterprise system 110, such as by analyzing logs from various tools used to monitor that enterprise system 110. The ontology generation module 114 is also configured to generate an IT asset ontology, which illustratively comprises a knowledge graph with nodes in the knowledge graph representing IT assets and edges between the nodes representing the identified dependencies between the IT assets.

The IT asset management module 116 is configured to monitor the plurality of IT assets of the enterprise system 110 to detect one or more events. Responsive to detecting a given one of the one or more events, the IT asset management module 116 is configure to utilize the IT asset ontology generated by the ontology generation module 114 to identify one or more of the plurality of IT assets of the enterprise system that are affected by the given event. The IT asset management module 116 is further configured to apply one or more remedial measures to at least a given one of the identified IT assets of the enterprise system 110 affected by the given event, such as by applying security hardening measures to mitigate security threats, modifying the configuration of IT assets, etc.

It is to be appreciated that the particular arrangement of the automated IT asset ontology generation system 102, the data collection module 112, the ontology generation module 114 and the IT asset management module 116 illustrated in the FIG. 1 embodiment is presented by way of example only, and alternative arrangements can be used in other embodiments. As discussed above, for example, the automated IT asset ontology generation system 102, the data collection module 112, the ontology generation module 114 and the IT asset management module 116 may in some embodiments be implemented internal to one or more of the client devices 104, the enterprise system 110, or combinations thereof. As another example, the functionality associated with the data collection module 112, the ontology generation module 114 and the IT asset management module 116 may be combined into fewer modules, or separated across more modules with the multiple modules possibly being implemented with multiple distinct processors or processing devices.

At least portions of the data collection module 112, the ontology generation module 114 and the IT asset management module 116 may be implemented at least in part in the form of software that is stored in memory and executed by a processor.

It is to be understood that the particular set of elements shown in FIG. 1 for the automated generation of an IT asset ontology utilized to manage IT assets of an enterprise system is presented by way of illustrative example only, and in other embodiments additional or alternative elements may be used. Thus, another embodiment may include additional or alternative systems, devices and other network entities, as well as different arrangements of modules and other components.

The automated IT asset ontology generation system 102 and other portions of the system 100 may be part of cloud infrastructure as will be described in further detail below. The cloud infrastructure hosting the automated IT asset ontology generation system 102 may also host one or more of the client devices 104, the ontology database 108 and the enterprise system 110.

The automated IT asset ontology generation system 102 and other components of the information processing system 100 in the FIG. 1 embodiment are assumed to be implemented using at least one processing platform comprising one or more processing devices each having a processor coupled to a memory. Such processing devices can illustratively include particular arrangements of compute, memory, storage and network resources.

The automated IT asset ontology generation system 102, client devices 104, ontology database 108 and enterprise system 110 or components thereof may be implemented on respective distinct processing platforms, although numerous other arrangements are possible. For example, in some embodiments at least portions of the automated IT asset ontology generation system 102 and one or more of the client devices 104 are implemented on the same processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the automated IT asset ontology generation system 102, client devices 104, ontology database 108, enterprise system 110, or portions or components thereof, to reside in different data centers. Numerous other distributed implementations are possible. The automated IT asset ontology generation system 102 or portions thereof can also be implemented in a distributed manner across multiple data centers.

Additional examples of processing platforms utilized to implement the automated IT asset ontology generation system 102 and other portions of the system 100 in illustrative embodiments will be described in more detail below in conjunction with FIGS. 7 and 8.

It is to be appreciated that these and other features of illustrative embodiments are presented by way of example only, and should not be construed as limiting in any way.

An exemplary process for automated generation of an IT asset ontology utilized to manage IT assets of an enterprise system will now be described in more detail with reference to the flow diagram of FIG. 2. It is to be understood that this particular process is only an example, and that additional or alternative processes for automated generation of an IT asset ontology utilized to manage IT assets of an enterprise system may be used in other embodiments.

In this embodiment, the process includes steps 200 through 210. These steps are assumed to be performed by the automated IT asset ontology generation system 102 utilizing the data collection module 112, the ontology generation module 114 and the IT asset management module 116. The process begins with step 200, obtaining information regarding a plurality of IT assets in use across an enterprise system. The enterprise system may include various physical and virtual computing resources, and the IT assets may comprise software (e.g., OSes, applications, services, etc.) running on the physical and virtual computing resources. The IT assets may also include coding languages, coding frameworks, software libraries, software components, etc., that are utilized by the software running on the physical and virtual computing resources, as well as the physical and virtual computing resources themselves or operators or users thereof. Step 200 may include identifying the plurality of IT assets and mapping respective ones of the plurality of IT assets to IT products in an IT product taxonomy. Step 200 may further include associating respective ones of the plurality of IT assets with metadata collected from one or more tools that monitor the IT assets of the enterprise system.

In step 202, dependencies between the plurality of IT assets in use across the enterprise system are identified. Step 202 may include extracting the dependencies from security information and event management (SIEM) logs, from application performance management (APM) logs, etc. An IT asset ontology is generated in step 204. The IT asset ontology comprises a knowledge graph with nodes representing the plurality of IT assets and edges between the nodes representing dependencies between the plurality of IT assets.

Figure 2:
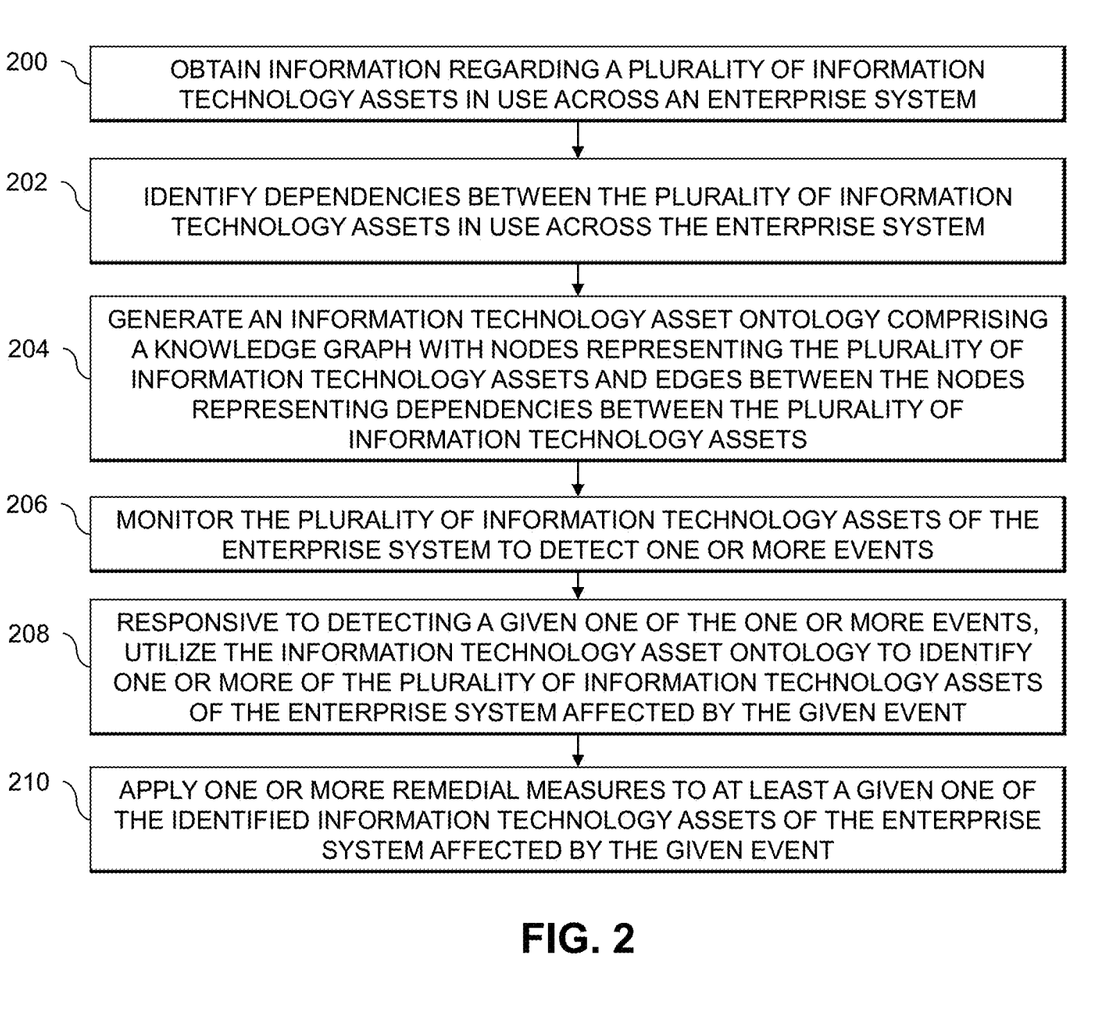
FIG. 2 is a flow diagram of an exemplary process for managing information technology assets utilizing automated ontologies in an illustrative embodiment.

The FIG. 2 process continues with step 206, monitoring the plurality of IT assets of the enterprise system to detect one or more events. Step 206 may include providing one or more interfaces for accessing the IT asset ontology, and detecting the given event may comprise utilizing at least one of the one or more interfaces. The one or more interfaces may comprise a graphical user interface (GUI) providing user interface features for selecting at least one of one or more nodes and one or more edges of the knowledge graph of the IT asset ontology for exploratory analytics.

The one or more interfaces may also or alternatively comprise a data access interface and a visualization interface, the visualization interface providing a view of a selected portion of the IT asset ontology in response to one or more queries submitted via the data access interface. The one or more queries may comprise at least one of: determining IT investments of the enterprise system in one or more designated types of IT assets; determining an amount of IT investment by the enterprise system in the one or more designated types of IT assets; and determining a cost of maintaining the one or more designated types of IT assets in the enterprise system. The one or more queries may also or alternatively comprise at least one of: determining whether one or more designated types of IT assets are in use by the enterprise system; determining where the one or more designated types of IT assets are in use by the enterprise system; and determining how the one or more designated types of IT assets are being used in the enterprise system. The one or more queries may also or alternatively comprise performing a strengths, weaknesses, opportunities and threats (SWOT) analysis on at least one of: one or more designated types of IT assets of the enterprise system; and one or more particular instances of the one or more designated types of IT assets of the enterprise system. The one or more queries may further or alternatively comprise determining an impact of changing a given instance of an IT asset of a first type to an IT asset of a second type.

Responsive to detecting a given one of the one or more events, the IT asset ontology is utilized in step 208 to identify one or more of the plurality of IT assets of the enterprise system affected by the given event. In step 210, one or more remedial measures are applied to at least a given one of the identified IT assets of the enterprise system affected by the given event. Step 210 may include applying one or more security hardening measures to the given identified IT asset, modifying a configuration of the given identified IT asset, etc.

An entity, organization or other enterprise may utilize various IT assets in an associated enterprise system. An enterprise may utilize or depend on a wide variety of IT assets (e.g., IT system components) that need to be managed and supported by IT staff. Such IT assets may in some cases expose the enterprise to legal (e.g., license, copyright, etc.) and security threats that necessitate quick identification and resolution.

IT asset portfolio management may depend on various different management software as well as private files (e.g., spreadsheets, presentations, documents, etc.), and thus requires significant manual effort to collate the information. IT development and support teams may use SIEM tools and APM tools to troubleshoot and debug issues associated with IT assets. The SIEM tools enable search, monitoring and analysis of machine-generated big data with a user interface for generating graphs, reports, alerts, dashboards, visualizations, etc. The APM tools enable analysis of application performance. Product managers and architects may depend on some or all of the above, as well as so-called "tribal knowledge" of the enterprise (e.g., unwritten information not commonly known by others in the enterprise) to find and initiate engagements, to perform impact analysis, to perform size analysis, etc. There is no single, dependable and comprehensive source providing a summarized view of the IT ecosystem of an enterprise.

Illustrative embodiments enable IT staff to identify IT assets at risk quickly and efficiently, such that appropriate remedial action may be taken to optimize the cost of IT management. To do so, some embodiments automate the process of creating and updating an IT asset ontology for an enterprise. As used herein, the term "IT asset ontology" refers to a taxonomy (e.g., a formal structure of classes or types of objects within a domain) plus the behaviors of entities and relationships between them. The IT asset ontology in some embodiments includes a set of concepts and categories in a subject area or domain (e.g., of IT assets) that shows the properties of the IT assets and the relationships between them. The IT asset ontology may include useable domain data (e.g., formal names, definitions and attributes of entities and IT assets) in a format that is easy to consume by human users and which is primed for consumption by artificial intelligence (AI) and machine learning (ML) algorithms.

Advantageously, the IT ontology is automatically updated, and can be used to provide a curated graph or other visualization of the IT landscape of the enterprise with accurate and up-to-date insights on the technology stack of the enterprise, including cross-product dependencies and support information. The technology stack of the enterprise, also referred to herein as the tech stack, includes a list of all IT assets that are used across the enterprise. Such IT assets may include coding frameworks, coding languages, software libraries, software components, software (e.g., OSes, applications, services, etc.) processes, physical and virtual computing resources, etc.

In some embodiments, an IT asset ontology provides an efficient and accurate way to answer a variety of questions or queries from different individuals or groups associated with an enterprise system. A chief experience officer (CXO), for example, may seek to determine the IT investments of an enterprise system, to determine where IT investments are, to know what the tech stack of the enterprise system is, etc. The CXO may also want data for SWOT analysis on platforms, languages, frameworks and other types of IT assets. The CXO may further desire data associated with the impact of changing particular IT assets, the cost of keeping up or maintaining particular IT assets, etc.

Product teams of the enterprise system may want to know the tools and technologies in use across the enterprise system, such as the platforms available. The product teams may also want to know what the tech stack is. A product team may also desire to use a particular IT asset and want to know if that IT asset is part of the tech stack for the enterprise system (and if so, who uses it and for what purpose). A product team may also seek to understand the system flow of various entities, and can use the IT ontology to obtain a dependency graph across all systems that the product team can review. A product team may also desire to know what new technologies are available. Product owners may want to understand the impact of changes across the ecosystem of the enterprise, to know where reliable sources of such information are, to determine the subject matter experts (SMEs), etc.

Without use of the IT asset ontologies described herein, answering several of the above questions may require searching and seeking out various places to get the desired information. Further, the information that is gathered or collated using such manual processes is often of questionable quality.

A view of the tech stack and IT assets used across an enterprise system is currently not available, and collating the data required to create such a view requires significant manual effort and time leading to sub-optimal decisions. Further, an enterprise-wide dependency graph across applications, processes and other IT assets is difficult to access or is not available. Some embodiments provide an interface for searching and analyzing a single knowledge graph or IT asset ontology that merges various IT system properties. The IT asset ontology provides an automatically updated and curated graph of the IT landscape, with always current and accurate insights on the IT tech stack and cross-product dependency details. The IT asset ontology is made available for programmatic and exploratory analytics by various individuals and groups within or associated with an enterprise (e.g., a CXO, portfolio management and enterprise architecture teams, security and compliance teams, finance and audit teams, engineering teams, product and program management teams, IT and enterprise leadership, etc.). The IT asset ontology provides accurate information at the point of consumption while avoiding time and resource wastage in data gathering.

The IT asset ontology or knowledge graph may be seeded with IT product taxonomy data and a master list of software licenses, contracts and other tags. Such data may be enriched with other input, such as using a custom software component that manages tech stack components of a given source tree to identify languages, platforms, frameworks, libraries and components used in each deployment unit for IT assets. A process that manages dependencies (e.g., extract, transform, load (ETL) jobs) can be used to extract dependencies across IT assets. Service dependencies may be extracted from SIEM and APM logs. A query engine and a set of algorithms enable knowledge inference and visualization of the data (e.g., indirect dependencies, duplicates, sub-optimal connections, aggregations, etc.).

Key metrics of the IT asset ontology include, but are not limited, to the time required to identify all dependencies accurately, the time required to gather tech stack insights, and the accuracy of IT asset details and dependencies. Operating expenses for maintaining the IT asset ontology include costs associated with a product team under development and operations to build and manage automation, dataset and user experience (UX). Operating expenses for maintaining the IT asset ontology also include costs of a graph database repository and related support. Advantageously, however, IT asset ontologies described herein provide savings associated with reuse and consolidation of data and opportunity costs. as well as savings in time for finding and collating dependency details during Major Incident Management (MIM) (e.g., a managed process for resolving important service disruptions and documenting the issues and associated resolutions), in portfolio planning, etc. Further, the IT asset ontology provides savings associated with the opportunity cost of not having a dataset available to infer insights about systems, processes, technology components, features and other IT assets using ML and visualization tools as described herein.

In some embodiments, the IT asset ontology provides a knowledge graph that augments a configuration management database (CMDB) of an enterprise system. The IT asset ontology is modeled and organized to optimize exploratory analytics, and is continuously updated to stay current and accurate. The IT asset ontology leverages the software development lifecycle (SDLC) to automate data updates, providing continuous integration as well as static code and configuration analysis. Disparate or disconnected datasets provide sources of information to the IT asset ontology. Such datasets include dependency information extracted from STEM tools and APM tools, as well as surveys and forms and other crowdsourced data tagging and labeling information. AI and ML techniques may be utilized to discover and expose insights, including cyclic networks, data clustering, pattern hatching, etc. Algorithmic analysis may be applied to identify clusters, regression and trends, etc. Natural language processing (NLP) and graph techniques may also be used. Such AI and ML insights may be accessible through various APIs, with a visualization and query interface being provided. The APIs may also be configured to enable pre-defined and customizable queries and reports.

Figure 3:
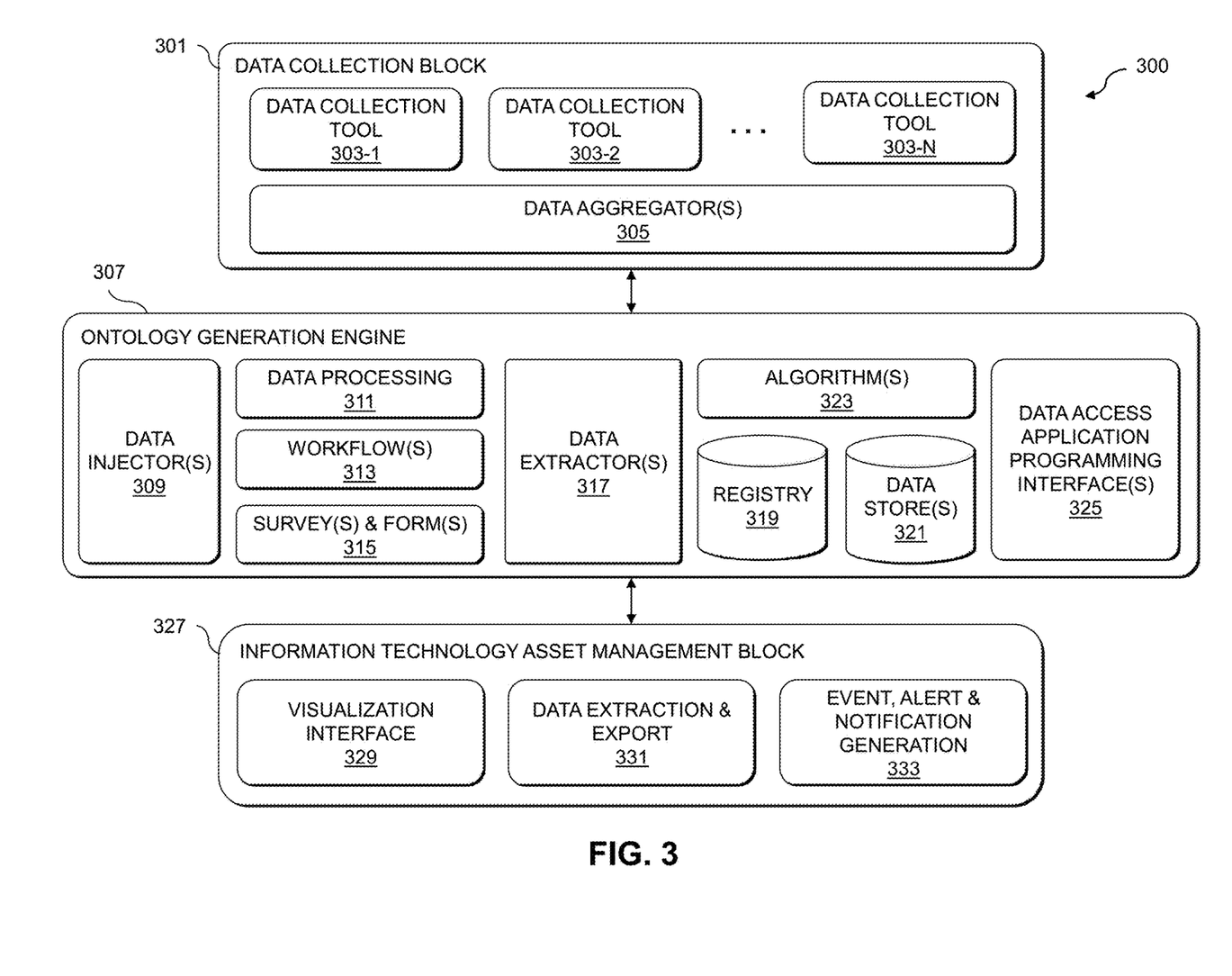
FIG. 3 is a block diagram of components of an information technology asset management system in an illustrative embodiment.

FIG. 3 shows an IT asset management system 300 (e.g., implemented by automated IT asset ontology generation system 102 utilizing data collection module 112, ontology generation module 114 and IT asset management module 116). The IT asset management system 300 includes a data collection block 301, which implements a set of data collection tools 303-1, 303-2, . . . 303-N (collectively, data collection tools 303). The data collection tools 303, in some embodiments, include data collection tool 303-1 for CI/CD tasks, data collection tool 303-2 for Customer Master Data Management (CMDM++) (e.g., a master data system of records for managing customer-specific information), data collection tool 303-3 for SIEM, data collection tool 303-4 for APM, etc. A data aggregator 305 is provided to aggregate data from the different data collection tools 303 for delivery to an ontology generation engine 307. The data aggregator 305 is configured to collect the data and transform the data into a common schema so that the data from the different data collection tools 303 match the needs of the ontology generation engine 307.

The data collection tools 303 are configured to extract tech stack information, such as by using assertions on primitive heuristics (e.g., makefile, compiler, folder structure, etc.) and assertions from static code analysis (e.g., dependencies, licenses, versions, etc.). The output of such assertions may be saved (e.g., in JavaScript Object Notation (JSON) format) and submitted to the data aggregator 305, which provides a central ingestion API for providing the collected data to the ontology generation engine 305.

In some embodiments, data collection block 301 automates the data collection process. For example, data collection tasks may be integrated with CI/CD process templates in the CI/CD data collection tool 303-1. Data collection tasks such as ETL tasks may be scheduled within the SIEM data collection tool 303-3 or APM data collection tool 303-4, etc.

The data collection tools 303, in some embodiments, are also configured to extract IT asset interdependencies, such as using custom data extraction dashboards on the STEM data collection tool 303-3. Starting with a source (e.g., an IT asset represented in the IT asset ontology), the custom data extraction dashboard will find and label all outgoing network connections. The custom data extraction dashboard may be used for collecting information that is not otherwise made available (e.g., for information that cannot be extracted from source code analysis or other available data sources, etc.). For example, the custom data extraction dashboard may be used for database servers to identify and label incoming network connections and associated parameters (e.g., server address, login user identifier, password or other credentials, database name, etc.). Such information may be hidden or cannot be extracted from source code analysis of the other components which connect to the database servers.

Custom data extraction dashboards may also be used with the APM data collection tool 303-4, with information collected from the APM data collection tool 303-4 being augmented with information collected from the SIEM data collection tool 303-3. For example, an IT asset such as an application may be identified in the IT asset ontology as having a connection to a database, along with attributes of the application including but not limited to an IP address of a server hosting the application. When the data collection tools 303 is working on the database servers, the data collection tools 303 will inspect the logs its incoming traffic. If the data collection tools 303 can locate the IP address of the application in the logs, an association may be created in the IT asset ontology between the application and the database or database server. Thus, information such as "application X depends on database Y" may be added to augment a node for application X in the IT asset ontology.

The ontology generation engine 307 is configured to persist incoming data from the data aggregator 305 of data collection block 301, and to steward the persisted data for automated generation of the IT asset ontology. Data stewarding, in some embodiments, includes situations where a subject matter expert (SME) (e.g., including but not limited to a human expert) reviews and approves or rejects the data collected automatically. Continuing with the example above, the system has augmented the node for application X with "application X depends on database Y." The application owner, or another SME for application X, is able to review this assertion and accept or reject it. If rejected, the IT asset ontology (e.g., the node for application X) may be augmented with information capturing the reasons for the rejection. This process can be accomplished with one or more of the modules 311, 313 and 315 described below (e.g., using surveys and forms module 315 to provide appropriate survey questions to the knowledge experts and collect the answers for data stewarding).

The ontology generation engine 307 implements data injectors 309 for taking incoming data from the data aggregator 305 of the data collection block 301 and providing such incoming data to data processing module 311, to workflows module 313, and to surveys and forms module 315. The data processing module 311 maps the incoming data to particular products or IT assets, and the workflows module 313 enriches the data with metadata tag information (e.g., alternatives, cost, licensing, availability, etc.). The data processing module 311 employs logic to change the format of that data and match it with the scheme of the data elements (e.g., transforms the data to the common schema). In some embodiments, the data processing module 311 utilizes code that is built into code blocks (e.g., functions and methods) that are run without requiring human or other user interface interactions. The workflows module 313 is configured to implement sequences of step or other actions that include data processing code blocks and other user interaction steps such as displaying survey questions and collecting answers, sending email or other notifications, etc. The surveys and forms module 315 identifies SMEs and generates surveys and forms that are delivered to the identified SMEs to further enrich the tech stack information.

Data extractors 317 of the ontology generation engine 307 extract processed data from the data processing module 311, the workflows module 313 and the surveys and forms module 315 and saves the IT asset information to one or both of the registry 319 and the data stores 321. The registry 319 provides a formal, reviewed and approved or accepted set of information that is used as master data for the IT asset ontology while the data stores 321 provide a repository for all other data such as summary views, data that is pending review, etc. It should be appreciated that in some embodiments, the registry 319 and data stores 321 may be combined into a common repository. The data extractors 317 also convert the processed data into nodes (e.g., representing IT assets) and links (e.g., edges between the nodes representing the IT assets) as a graph or graphs in data stores 321. Algorithms module 323 runs scheduled jobs to evaluate, update and summarize the IT asset information in registry 319 and the graph or ontology stored in data stores 321 as required for consumption. This may include gathering summary information or precomputing the IT asset ontology in a format that is used in dashboards and reports. For example, such scheduled jobs may include tabulating a list of IT assets by programming language used, determining a total number of licenses used by one or more IT assets or IT asset types along with the estimated cost for such licenses, generating a summary list of all IT assets that include components with a particular type of license, etc. The algorithms module 323 may utilize various supervised machine learning algorithms to accomplish the scheduled jobs. For example, supervised machine learning algorithms may be used to determine the probability of breaking functionality of an application X if application Y is changed, or determining the impact of updating a particular application from one version to another, etc.

Figure 4:
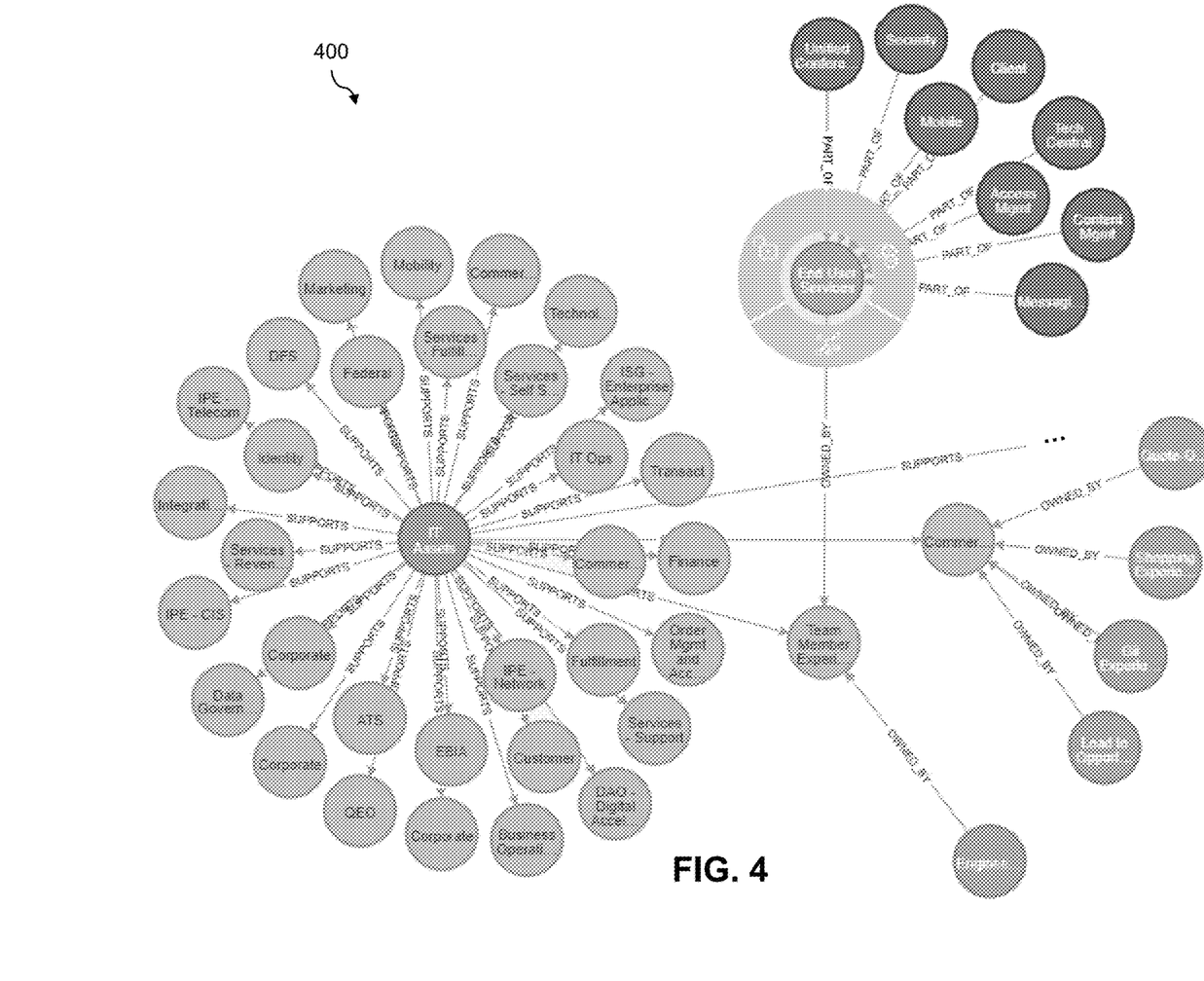
FIG. 4 is a visualization of a portion of an information technology asset ontology in an illustrative embodiment.
Figure 5:
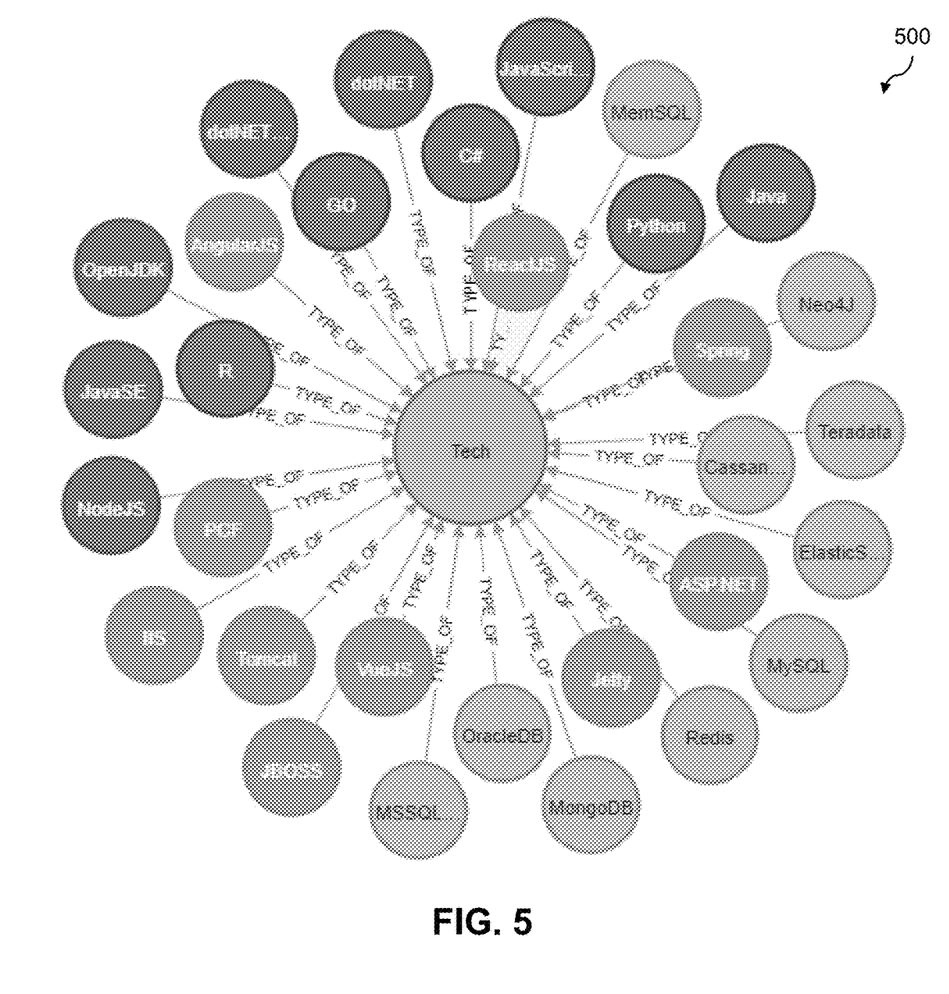
FIG. 5 is another visualization of an information technology asset ontology in an illustrative embodiment.

The ontology generation engine 307 further implements data access APIs 325 for exposing the IT asset ontology to IT asset management block 327. The data access APIs 325 may include a GraphQL API for programmatic access by the IT asset management block 327 to the IT asset ontology (e.g., stored as graph(s) in data stores 321 along with IT asset information in the registry 319, as updated and summarized by the algorithms module 323). The IT asset management block 327 provides a visualization interface 329, which provides the ability for a user to view selected portions of the IT asset ontology (e.g., by defining and submitting queries to the data access APIs 325, by reusing queries, etc.). The visualization interface 329 further provides a graphical user interface (GUI) for exploratory analytics, such as by providing user interface features for selecting nodes or edges in a graph of the IT asset ontology. FIGS. 4 and 5 show example visualization 400 and 500, respectively, of portions of an IT asset ontology.

The IT asset management block 327 further includes a data extraction and export module 331, which is configured to utilize data access APIs 325 to allow a user to save and send portions of the IT asset ontology as desired. The data access APIs 325 provide mechanisms for exposing data from within the IT asset ontology, similar to querying a database. The data access APIs 325 in some embodiments enable users to automate the process of extracting the data they want from the IT asset ontology (e.g., a count of the number of IT assets that use a particular version of an application in the enterprise system, a list of applications that use a particular type of database along with contact information for users that manage such applications, etc.). The data access APIs 325 in some embodiments allow users to extract and save the underlying data behind a graphical view of a portion of the IT asset ontology.

The IT asset management block 327 further includes event, alert and notification generation module 333, which can automatically generate events, alerts and notifications (e.g., for delivery to host agents on client devices 104 as described above to initiate remedial action in the enterprise system 110).

Figure 6:
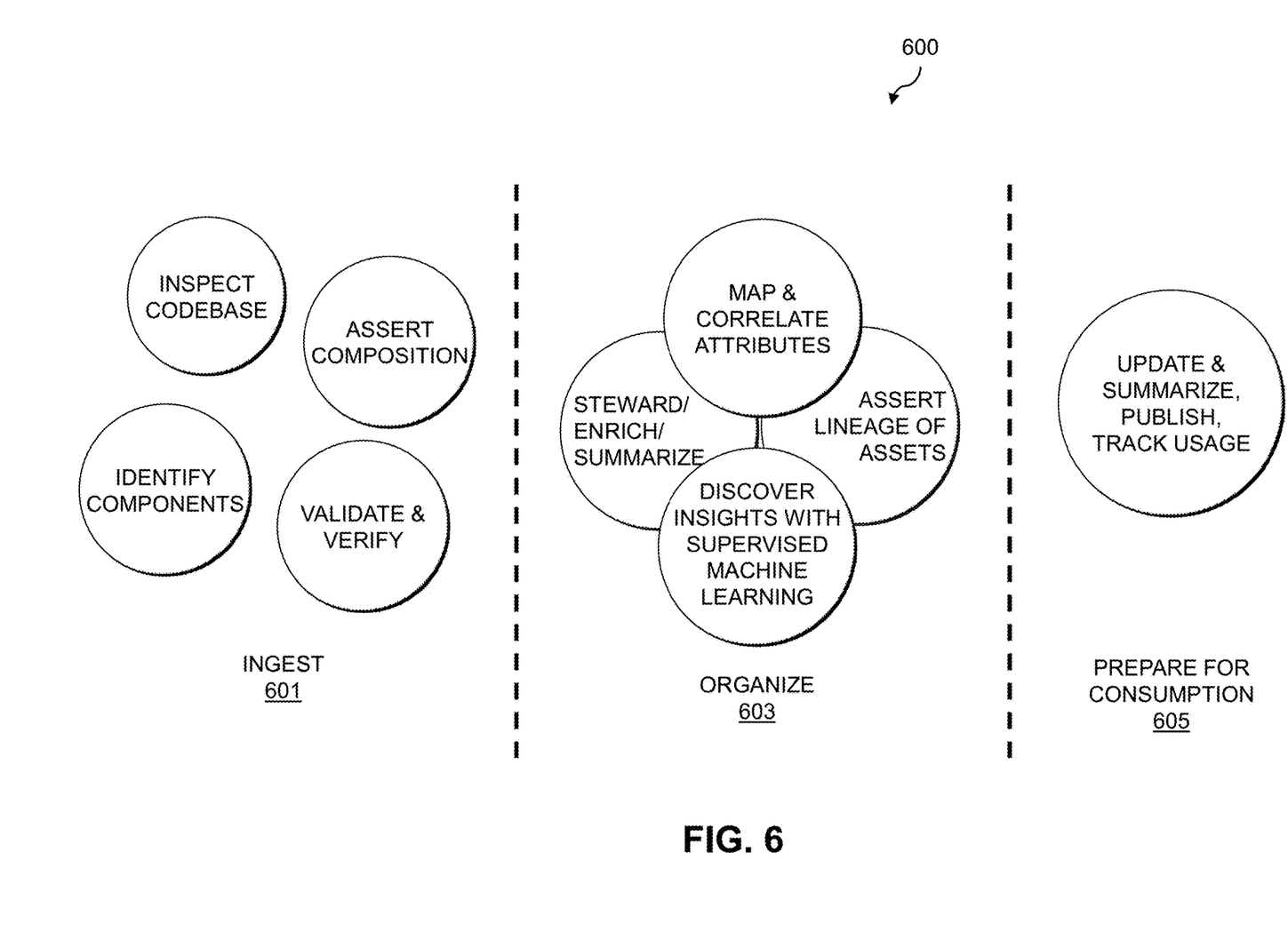
FIG. 6 is a system flow of operation of an automated information technology asset ontology generation system in an illustrative embodiment.

FIG. 6 shows a system flow 600 of operation of the automated IT asset ontology system 102. The system flow 600 includes an ingestion phase 601, an organization phase 603, and a prepare for consumption phase 605. The ingestion phase 601 includes inspecting available codebases, identifying components or IT assets, asserting composition of the IT assets, and validating and verifying the IT assets. The organization phase 603 includes mapping and correlating attributes of the IT assets, stewarding, enriching and summarizing the IT assets, asserting lineage of the IT assets (e.g., identifying inter-dependencies across IT assets and capture related details, such as when an application X has a dependency on application Y and application Y has been updated to a new version, etc.), and discovering insights with supervised machine learning algorithms. The prepare for consumption phase 605 includes updating and summarizing the IT asset ontology, publishing the IT asset ontology, and tracking usage of the IT asset ontology.

Automating the management of an IT asset ontology graph, in some embodiments, proceeds as follows. Portfolio data from a product taxonomy is loaded. Next IT asset data for an enterprise system is loaded, and the IT assets are mapped to products in the product taxonomy. This may involve enriching and cleansing with metadata tags information regarding alternatives, costs, licensing, availability, etc. Data stewardship and role-specific insights may also be used to enrich the IT asset data. On each deployment (e.g., physical or virtual computing resource in the enterprise system), application assets are identified and tech stack information is extracted (e.g., from code, from surveys or forms completed by SMEs, etc.). Over an IT asset's lifespan, such as the lifespan of an application, developers may fix bugs or add enhancements (e.g., new or upgraded features and functionality) multiple times and make these changes available to the user of the application or other IT asset. Each of these changes represents a different deployment. At each deployment, there is a potential change to the taxonomy of the IT asset (e.g., a new component may be added, a database may have been replaced, a dependency on another asset may be introduced, etc.). The initial step is to map IT assets to IT products in the taxonomy. Every time an IT product is updated (e.g., where this event is also referred to as a deployment), the IT assets are re-evaluated to capture any changes to it. The tech stack information is then mapped to IT assets and the ontology is updated. On a schedule (e.g., every x days), dependency graphs for the IT assets may be extracted from SIEM tools, APM tools, SMEs surveys and forms, etc. Such dependency graphs are mapped to the IT assets and the ontology is updated. The IT asset ontology may then be reviewed and analyzed (e.g., through visualizations thereof, through querying the IT asset ontology, combinations thereof, etc.) to extract insights using data stewardship and data science.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for automated generation of an IT asset ontology utilized to manage IT assets of an enterprise system will now be described in greater detail with reference to FIGS. 7 and 8. Although described in the context of system 100, these platforms may also be used to implement at least portions of other information processing systems in other embodiments.

Figure 7:
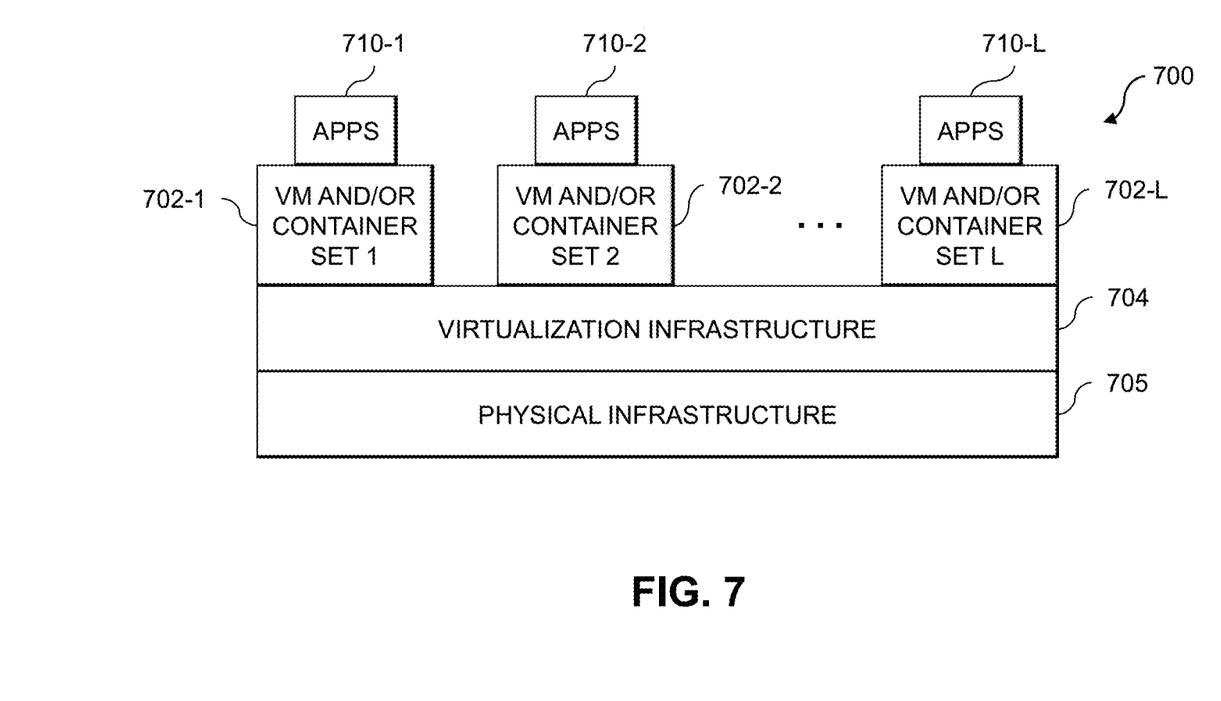
FIGS. 7 and 8 show examples of processing platforms that may be utilized to implement at least a portion of an information processing system in illustrative embodiments.
Figure 8:
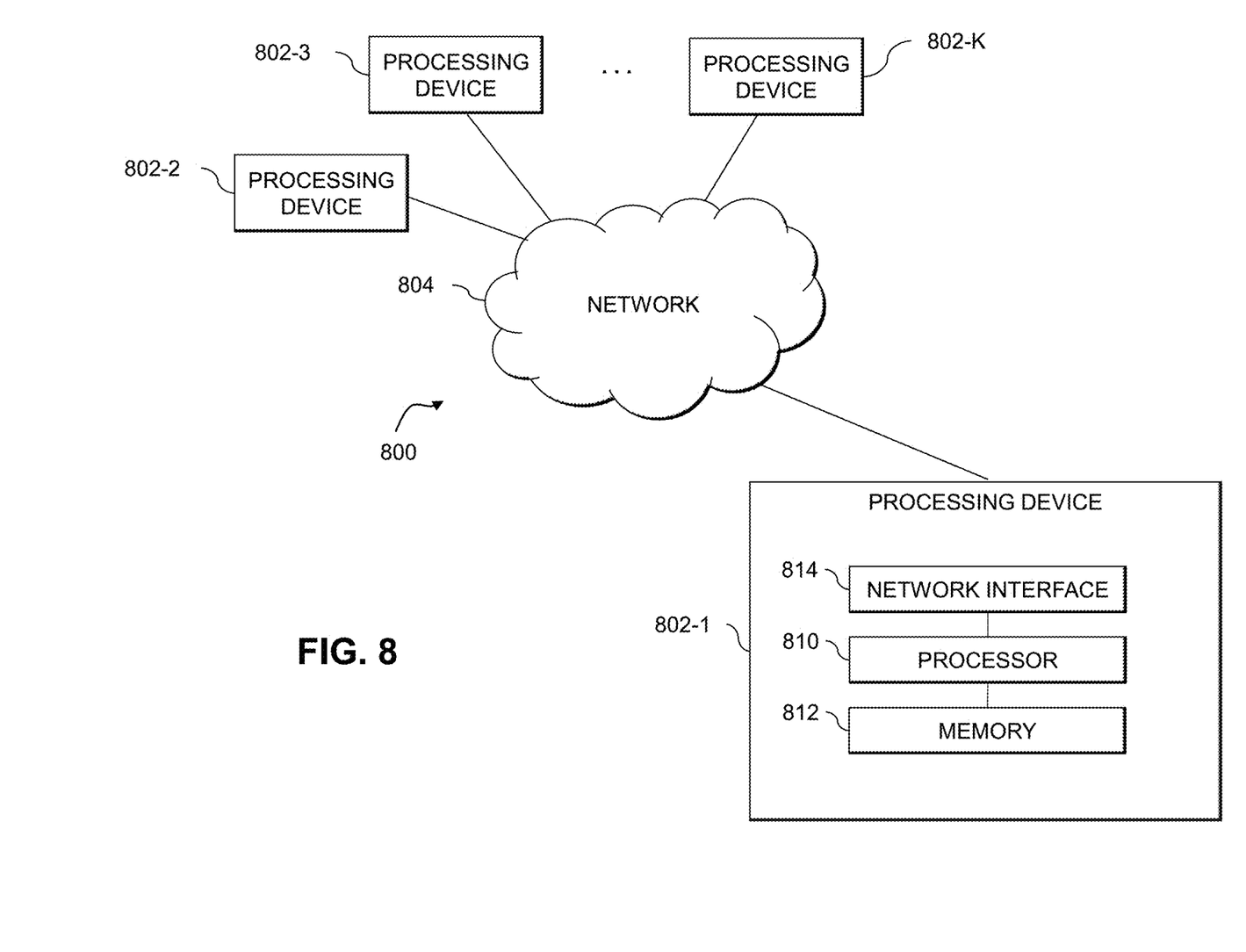

FIG. 7 shows an example processing platform comprising cloud infrastructure 700. The cloud infrastructure 700 comprises a combination of physical and virtual processing resources that may be utilized to implement at least a portion of the information processing system 100 in FIG. 1. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for automated generation of an IT asset ontology utilized to manage IT assets of an enterprise system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IT assets, data collection tools, data sources, visualizations, queries, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising steps of:
   obtaining information regarding a plurality of information technology assets in use across an enterprise system;
   identifying dependencies between the plurality of information technology assets in use across the enterprise system;
   generating an information technology asset ontology comprising a knowledge graph with nodes representing the plurality of information technology assets and edges between the nodes representing dependencies between the plurality of information technology assets;
   monitoring the plurality of information technology assets of the enterprise system to detect one or more events;
   responsive to detecting a given one of the one or more events, utilizing the information technology asset ontology to identify one or more of the plurality of information technology assets of the enterprise system affected by the given event; and
   applying one or more remedial measures to at least a given one of the identified information technology assets of the enterprise system affected by the given event;
   wherein the method is performed by at least one processing device comprising a processor coupled to a memory.

2. The method of claim 1 wherein the enterprise system comprises one or more physical and virtual computing resources, and wherein one or more of the plurality of information technology assets comprise at least one of:
one or more operating systems running on the physical and virtual computing resources; and
one or more applications running on the physical and virtual computing resources.

3. The method of claim 1 wherein the enterprise system comprises one or more physical and virtual computing resources, and wherein one or more of the plurality of information technology assets comprise at least one of:
one or more coding languages utilized by software running on the physical and virtual computing resources;
one or more coding frameworks utilized by software running on the physical and virtual computing resources;
one or more software libraries utilized by software running on the physical and virtual computing resources; and
one or more software components utilized by software running on the physical and virtual computing resources.

4. The method of claim 1 wherein obtaining the information regarding the plurality of information technology assets in use across the enterprise system comprises:
identifying the plurality of information technology assets; and
mapping respective ones of the plurality of information technology assets to information technology products in an information technology product taxonomy.

5. The method of claim 4 wherein obtaining the information regarding the plurality of information technology assets in use across the enterprise system further comprises associating respective ones of the plurality of information technology assets with metadata collected from one or more tools that monitor the information technology assets of the enterprise system.

6. The method of claim 1 wherein identifying the dependencies between the plurality of information technology assets in the enterprise system comprises extracting dependencies from security information and event management logs and application performance management logs.

7. The method of claim 1 wherein monitoring the plurality of information technology assets of the enterprise system comprises providing one or more interfaces for accessing the information technology asset ontology, and wherein detecting the given event comprises utilizing at least one of the one or more interfaces.

8. The method of claim 7 wherein the one or more interfaces comprise a graphical user interface providing user interface features for selecting at least one of one or more nodes and one or more edges of the knowledge graph of the information technology asset ontology for exploratory analytics.

9. The method of claim 7 wherein the one or more interfaces comprise a data access interface and a visualization interface, the visualization interface providing a view of a selected portion of the information technology asset ontology in response to one or more queries submitted via the data access interface.

10. The method of claim 9 wherein the one or more queries comprise at least one of:
determining information technology investments of the enterprise system in one or more designated types of information technology assets;
determining an amount of information technology investment by the enterprise system in the one or more designated types of information technology assets; and
determining a cost of maintaining the one or more designated types of information technology assets in the enterprise system.

11. The method of claim 9 wherein the one or more queries comprise at least one of:
determining whether one or more designated types of information technology assets are in use by the enterprise system;
determining where the one or more designated types of information technology assets are in use by the enterprise system; and
determining how the one or more designated types of information technology assets are being used in the enterprise system.

12. The method of claim 9 wherein the one or more queries comprise performing a strengths, weaknesses, opportunities and threats analysis on at least one of:
one or more designated types of information technology assets of the enterprise system; and
one or more particular instances of the one or more designated types of information technology assets of the enterprise system.

13. The method of claim 9 wherein the one or more queries comprise determining an impact of changing a given instance of an information technology asset of a first type to an information technology asset of a second type.

14. The method of claim 1 wherein applying the one or more remedial measures to the given identified information technology asset comprises at least one of:
applying one or more security hardening measures to the given identified information technology asset; and
modifying a configuration of the given identified information technology asset.

15. A computer program product comprising a non-transitory processor-readable storage medium having stored therein program code of one or more software programs, wherein the program code when executed by at least one processing device causes the at least one processing device to perform steps of:
obtaining information regarding a plurality of information technology assets in use across an enterprise system;
identifying dependencies between the plurality of information technology assets in use across the enterprise system;
generating an information technology asset ontology comprising a knowledge graph with nodes representing the plurality of information technology assets and edges between the nodes representing dependencies between the plurality of information technology assets;
monitoring the plurality of information technology assets of the enterprise system to detect one or more events;
responsive to detecting a given one of the one or more events, utilizing the information technology asset ontology to identify one or more of the plurality of information technology assets of the enterprise system affected by the given event; and
applying one or more remedial measures to at least a given one of the identified information technology assets of the enterprise system affected by the given event.

16. The computer program product of claim 15 wherein monitoring the plurality of information technology assets of the enterprise system comprises providing one or more interfaces for accessing the information technology asset ontology, and wherein detecting the given event comprises utilizing at least one of the one or more interfaces.

17. The computer program product of claim 16 wherein the one or more interfaces comprise a data access interface and a visualization interface, the visualization interface providing a view of a selected portion of the information technology asset ontology in response to one or more queries submitted via the data access interface.

18. An apparatus comprising:
  at least one processing device comprising a processor coupled to a memory;
  the at least one processing device being configured to perform steps of:
    obtaining information regarding a plurality of information technology assets in use across an enterprise system;
    identifying dependencies between the plurality of information technology assets in use across the enterprise system;
    generating an information technology asset ontology comprising a knowledge graph with nodes representing the plurality of information technology assets and edges between the nodes representing dependencies between the plurality of information technology assets;
    monitoring the plurality of information technology assets of the enterprise system to detect one or more events;
    responsive to detecting a given one of the one or more events, utilizing the information technology asset ontology to identify one or more of the plurality of information technology assets of the enterprise system affected by the given event; and
    applying one or more remedial measures to at least a given one of the identified information technology assets of the enterprise system affected by the given event.

19. The apparatus of claim 18 wherein monitoring the plurality of information technology assets of the enterprise system comprises providing one or more interfaces for accessing the information technology asset ontology, and wherein detecting the given event comprises utilizing at least one of the one or more interfaces.

20. The apparatus of claim 19 wherein the one or more interfaces comprise a data access interface and a visualization interface, the visualization interface providing a view of a selected portion of the information technology asset ontology in response to one or more queries submitted via the data access interface.

* * * * *